(12) United States Patent
Galdamez

(10) Patent No.: US 7,624,675 B2
(45) Date of Patent: Dec. 1, 2009

(54) BARBEQUE PIT SMOKER

(76) Inventor: Jose D. Galdamez, 4517 Rose St., Texas, TX (US) 77007

( * ) Notice: Subject to any disclaimer, the term of this patent is extended or adjusted under 35 U.S.C. 154(b) by 586 days.

(21) Appl. No.: 11/473,812

(22) Filed: Jun. 23, 2006

(65) Prior Publication Data

US 2007/0028914 A1 Feb. 8, 2007

Related U.S. Application Data

(60) Provisional application No. 60/704,972, filed on Aug. 3, 2005.

(51) Int. Cl.
*A47J 37/04* (2006.01)
(52) U.S. Cl. .............. 99/340; 99/480; 99/482; 126/25 R; 126/9 R
(58) Field of Classification Search .............. 99/482, 99/480, 481, 467, 339, 340; 126/25 R, 9 R; 108/6, 50.13; 211/169, 169.1, 150
See application file for complete search history.

(56) References Cited

U.S. PATENT DOCUMENTS 4,348,948 A * 9/1982 Allison .................. 99/339
4,664,026 A * 5/1987 Milloy .................. 99/352
4,700,618 A * 10/1987 Cox, Jr. .................. 99/339
4,934,260 A * 6/1990 Blevins .................. 99/482
6,012,381 A * 1/2000 Hawn .................. 99/340
6,039,039 A * 3/2000 Pina, Jr. .................. 126/25 R
6,209,533 B1 * 4/2001 Ganard .................. 126/25 R
6,422,134 B1 * 7/2002 Barksdale et al. .............. 99/340

* cited by examiner

*Primary Examiner*—Reginald L Alexander
(74) *Attorney, Agent, or Firm*—Arnold & Knobloch, L.L.P.; Gordon T. Arnold; Charles S. Knobloch

(57) ABSTRACT

A barbeque pit smoker is provided, the smoker including a cooking pit having a first side, a second side, and a front side; an access door disposed on the front side of the cooking pit; a firebox disposed adjacent to the first side of the firebox; an adjustable pit entry port in communication between the cooking pit and the firebox; an upright chimney disposed adjacent to a second side of the cooking pit, the upright chimney in communication with the cooking pit; a first end of a shaft disposed on the adjustable entry port, whereby communication between the cooking pit and the firebox may be regulated; and a first rotating handle disposed on a second end of the shaft, the rotating handle disposed proximate to the access door.

7 Claims, 3 Drawing Sheets

BARBEQUE PIT SMOKER

STATEMENT OF RELATED CASES

This application claims the benefit of U.S. Provisional Application No. 60/704,972, filed Aug. 3, 2005.

FIELD OF THE INVENTION

The present invention relates generally to barbeque pit smokers, and more specifically to improved airflow from a firebox to a cooking pit.

BACKGROUND OF THE INVENTION

Barbeque pit smokers generally control air flowing into a firebox. New ways have been sought to provide convenient external and adaptive control of airflow out of the firebox, passing through a cooking pit, and to a chimney.

SUMMARY OF THE INVENTION

According to a first set of examples of the invention, there is provided a barbeque pit smoker including: a cooking pit having a first side, a second side, and a front side; an access door disposed on the front side of the cooking pit; a firebox disposed adjacent to the first side of the firebox; an adjustable pit entry port in communication between the cooking pit and the firebox; an upright chimney disposed adjacent to a second side of the cooking pit, the upright chimney in communication with the cooking pit; a first end of a shaft disposed on the adjustable entry port, whereby communication between the cooking pit and the firebox may be regulated; and a first rotating handle disposed on a second end of the shaft, the rotating handle disposed proximate to the access door.

In another example, the adjustable entry port of the above-described barbeque pit smoker includes one or more downwardly convex shaped baffles.

In another example, the above-described barbeque pit smoker further includes: a service table disposed proximate to the access door; a hinged member rotatably connecting the service table with the cooking pit; a receiving hole proximate to the access door disposed on the cooking pit; a slidable pin slidably disposed on the service table, the slidable pin fitably received by the receiving hole; and a second rotating handle forming at least a portion of the slidable pin. In a further example, the first rotating handle and said second rotating handle are substantially similar in structural operation.

In another example, the upright chimney of above-described barbeque pit smoker further includes a vaulted top portion.

In another example, the first rotating handle of above-described barbeque pit smoker further includes a screwing pressure knob disposed on the first rotating handle, the screwing pressure knob providing an adjustable amount of frictional force on the first rotating handle, thereby regulating the rotational mobility of the first rotating handle.

According to a second set of examples of the invention, there is provided a method for smoke barbeque cooking using a barbeque pit smoker having a firebox, a cooking pit, and an access area to the cooking pit, having the steps of: regulating airflow from the firebox to the cooking pit; controlling the regulating step from a location proximate to the access area of the cooking pit; and selectably locking the controlling step of the regulating step.

In another example, the regulating step of the above-described method includes vertical graduated baffling.

In another example, the above-described method further has the step of selectably deploying a table located proximate to the access area of the cooking pit. In a further example, the step of selectably deploying a table further includes locking the table in a deployed position. In a further example, the locking step is executed in a manner substantially similar to said controlling step.

According to a third set of examples of the invention, there is provided a system for barbeque pit smoking having a cooking pit with pit access, firebox, and upright chimney. The barbeque pit smoker system further includes means for regulating the airflow from the firebox to the cooking pit.

In another example, the airflow regulating means of the above-described system includes means to vertically graduate baffling of the airflow. In a further example, the vertically graduated baffling means includes one or more downwardly convex shaped baffles.

In another example, the regulating means of the above-described system further includes means to remotely control regulation of the airflow from the firebox to the cooking pit, the control means disposed proximate to the pit access of the cooking pit. In a further example, the control means is selectably lockable.

In another example, the upright chimney of the above-described system further includes a vaulted top portion.

In another example, the above-described system further includes means for selectably tabling, the selectable tabling means disposed proximate to the pit access of the cooking pit. In a further example, the selectable tabling means further includes means for supporting a table, the support means including a sliding pin and a means for controlling the sliding pin. In a further example, the sliding pin control means of the support means includes a first handle; the control means of the regulating means includes a second handle; and the first handle and the second handle present substantially similar structure. In a further example, the upright chimney further includes a vaulted top portion.

BRIEF DESCRIPTION OF THE SEVERAL DRAWINGS

DETAILED DESCRIPTION

Each of FIGS. 1-5 illustrates a barbeque pit smoker embodying various aspects of the present invention, though these particular embodiments are illustrated and described herein only for exemplary purposes. Moreover, variations of the barbeque pit smoker system and methods of utilizing the same will become apparent to those of ordinary skill in the relevant structural and mechanical arts upon reading the following disclosure. Thus, the present invention is not to be considered limited to only the structures, systems, and methods described herein.

Figure 1:
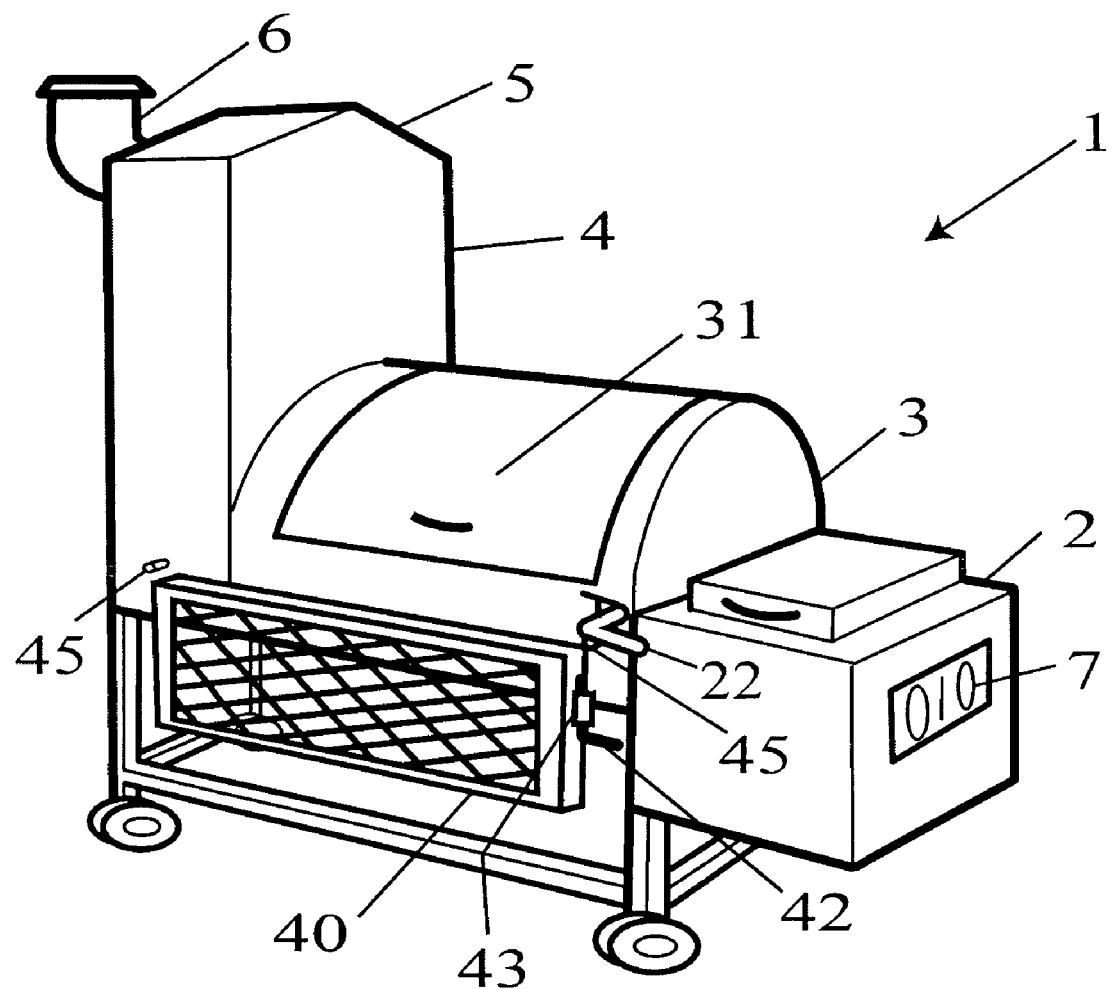
FIG. 1 is a 3-D perspective view of emplacement of barbeque pit smoking system.

As illustrated in FIG. 1, there is provided a 3-D perspective view of emplacement of barbeque pit smoking system 1. Barbeque pit smoking system 1 is made up of three main components: firebox 2 is disposed on one side of cooking pit 3, and an upright chimney 4 is disposed on a second side of cooking pit 3. Typically, air enters firebox 2 through vents 7 and is heated. The heated air passes from firebox 2 into cooking pit 3, cooking pit 3 being in gaseous communication with firebox 2. Fumes from the heated air pass through cooking pit 3, across food being cooked, to upright chimney 4, upright chimney 4 being in gaseous communication with cooking pit 3. Upright chimney 4 may have compartments for placement of other food articles. Upright chimney 4 typically has a smokestack 6 for the ultimate expulsion of fumes, steam, and other exiting gases.

In the present example, several additional features are illustrated. Upright chimney 4 is shaped to have a vaulted roof 5. Vaulted roof 5 provides an angle to the top of chimney 4, thereby directing condensation from areas otherwise prone to condensation accumulation and eventually rusting. This reduces the amount of debris, which would otherwise form, accumulate, and deposit into upright chimney 4 and cooking pit 3. Vaulted roof 5 also assists in managing overall airflow through barbeque pit smoking system 1 as the airflow exits by way of smokestack 6.

A backside of service table 40 is hinge-mounted on the front side of barbeque pit smoking system 1. A slidable pin 42 is fitted into a receiving collar 43, which is attached to service table 40. Typically, one slidable pin 42 is mounted on each of the sides of service table 40 which are adjacent to the backside of service table 40. Slidable pin 42 may be fitably received by a receiving hole 45, which is disposed on the main body of barbeque pit smoking system 1.

Shaft handle 22 is presented on the front side of barbeque pit smoking system 1 in the vicinity of the interface between firebox 2 and cooking pit 3. As will be illustrated further, shaft handle 22 controls airflow communication between firebox 2 and cooking pit 3.

Door 31 is disposed on cooking pit 3, providing an access to the interior of cooking pit 3. Typically, door 31 is used to place or remove food into or from cooking pit 3.

Figure 2:
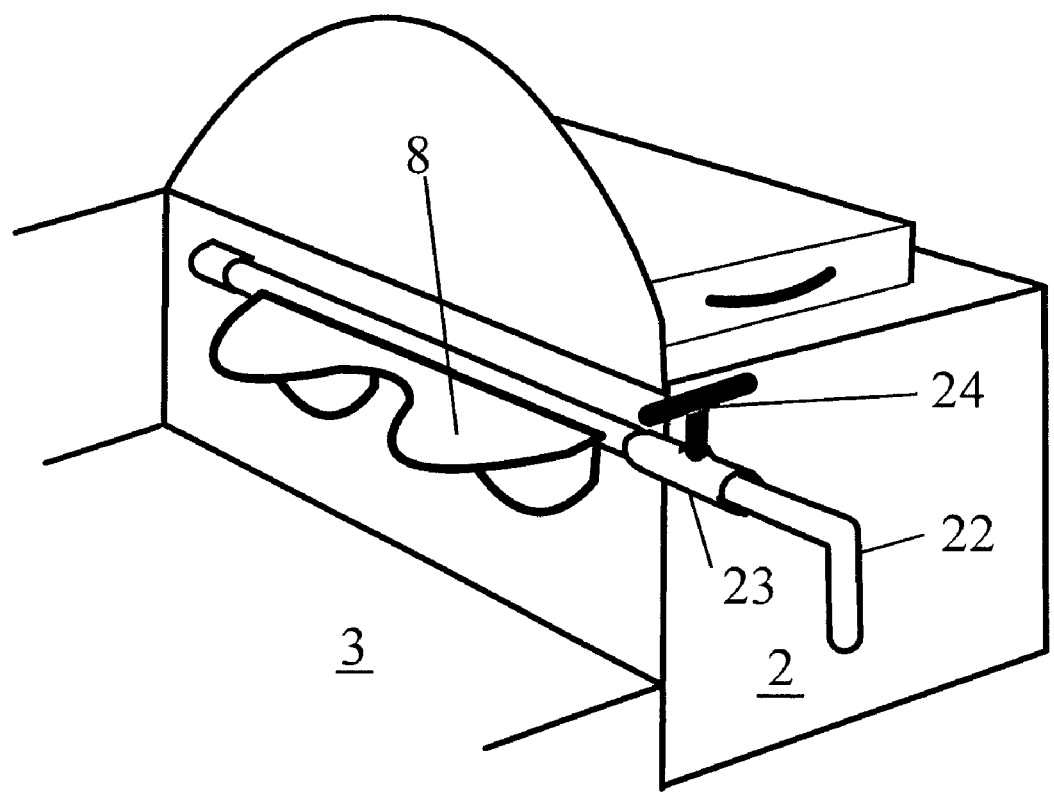
FIG. 2 is a 3-D perspective cut-away view showing an adjustable pit entry port of a barbeque pit smoking system.

As illustrated in FIG. 2, there is provided a 3-D perspective cut-away view showing adjustable pit entry port 8 of a barbeque pit smoking system 1. Cooking pit 3 is cut away to show the interior side of cooking pit 3 that is adjacent to firebox 2. One end of shaft handle 22 is rotably hinged on the interior side of cooking pit 3, positioned over openings between firebox 2 and cooking pit 3. The second end of shaft handle 22 protrudes from cooking pit 3 to the exterior. A hinge 23 is disposed on the exterior of barbeque pit smoking system 1, with shaft handle 22 protruding there through. Typically, the second end of shaft handle 22 is bent at a right angle to form a handle, or a handle member may be otherwise disposed on shaft handle 22.

A screwing pressure knob 24 may be disposed on hinge 23, providing an adjustable amount of friction on shaft handle 22. By rotating screwing pressure knob 24, shaft handle 22 may be allowed to freely rotate or shaft handle 22 may be fixed to a particular angular position.

Disposed along the axis of shaft handle 22 is a adjustable pit entry port 8, which is shaped to cover the openings between firebox 2 and cooking pit 3. In the present example, adjustable pit entry port 8 is a baffle that is shaped as two adjacent downward convex half-circles. Other shapes may be used, such as multiple half-circles or butterfly configuration.

The shape of adjustable pit entry port 8 provides an airflow pattern from firebox 2 to cooking pit 3 with pattern variations between the bottom and the top of adjustable pit entry port 8. Adjustable pit entry port 8 opens communication between firebox 2 and cooking pit 3 by rotation along the axis of shaft handle 22. The axis of rotation being near the top of adjustable pit entry port 8 establishes that a greater volume of opening will occur first at the lowest portion of adjustable pit entry port 8, which is most distant from the axis of rotation. Further, the convex half-circle shape establishes that the greater portion of the perimeter of adjustable pit entry port 8 will be in the lower portion of adjustable pit entry port 8 and will be generally more horizontal across the side of cooking pit 3 than vertical. The remaining perimeter of adjustable pit entry port 8 will be in the upper portion of the perimeter of adjustable pit entry port 8 and will be generally more vertical across the side of cooking pit 3 than horizontal. The airflow from firebox 2 encounters adjustable pit entry port 8 and diverts direction as it enters cooking pit 3. The amount and type of diversion is dependent on the vertical gradient, as the baffling created by adjustable pit entry port 8 provides: i) generally horizontal and larger volume airflow access towards the bottom of adjustable pit entry port 8, and ii) generally vertical and proportionately smaller volume airflow access towards the top of adjustable pit entry port 8. This provides a greatly controllable airflow pattern, as the baffle-like surfaces of adjustable pit entry port 8 tend to provide airflow shadows allowing a planar airflow of air mixed with vortices as the air flows around the perimeter of adjustable pit entry port 8. Improved cooking qualities in cooking pit 3 are experienced by this means of regulating airflow through vertically graduated airflow baffling.

Figure 3:
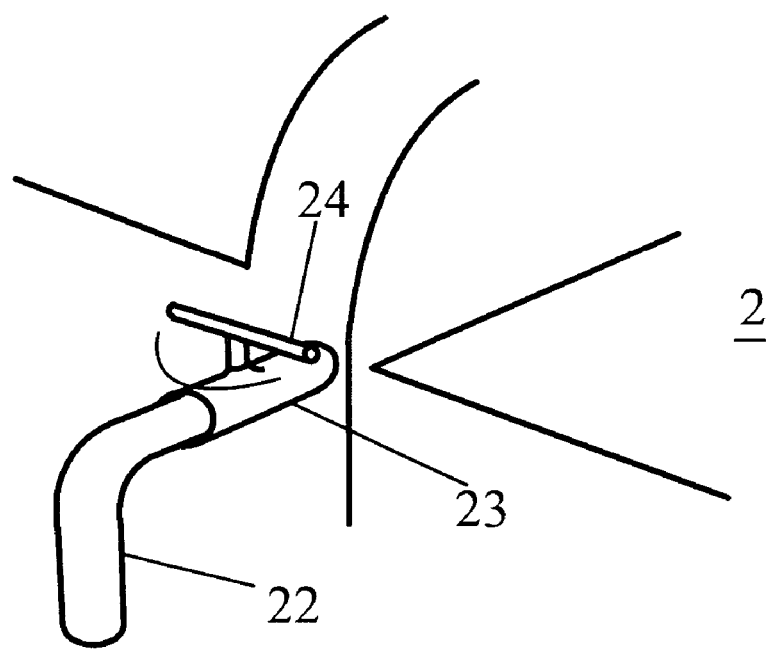
FIG. 3 is a 3-D perspective partial view showing a rotating handle with screwing pressure knob of a barbeque pit smoking system.

As illustrated in FIG. 3, there is provided a 3-D perspective partial view showing a rotating shaft handle 22 with screwing pressure knob 24 of barbeque pit smoking system 1. A screwing pressure knob 24 may be disposed on hinge 23, providing an adjustable amount of friction on shaft handle 22. By rotating screwing pressure knob 24, shaft handle 22 may be allowed to freely rotate or fixed to a particular angular position. Adjustable pit entry port 8 (FIG. 2) may therefore be rotated by shaft handle 22 to vary the total volume and vertical gradient of the opening between firebox 2 and cooking pit 3 (FIG. 2). Once a desired opening is established, a user may rotate screwing pressure knob 24 to fix the angular position of adjustable pit entry port 8 by immobilizing shaft handle 22, thereby fixing shaft handle 22 and adjustable pit entry port 8 to a particular angular position.

Figure 4:
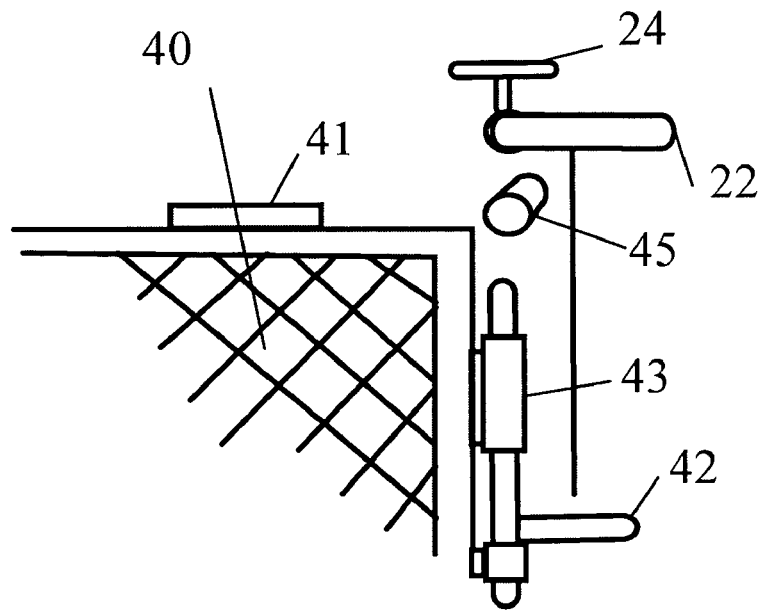
FIG. 4 is a partial frontal view showing a selectably deployable service table of a barbeque pit smoking system.

As illustrated in FIG. 4, there is provided a partial frontal view showing selectably deployable service table 40 of barbeque pit smoking system 1. A plurality of service table hinges 41 are disposed on the backside of service table 40, providing hinge-mounting of service table 40 to the front side of barbeque pit smoking system 1. A slidable pin 42 is fitted into a receiving collar 43, which is attached to service table 40. Typically, one slidable pin 42 is mounted on each of the sides of service table 40 which are adjacent to the backside of service table 40. Slidable pin 42 may be fitably received by a receiving hole 45, which is disposed on the main body of barbeque pit smoking system 1. Slidable pin 42 may be configured to incorporate a handle protruding perpendicular to the axis of rotation of slidable pin 42, or a handle member may be otherwise disposed on slidable pin 42.

Figure 5:
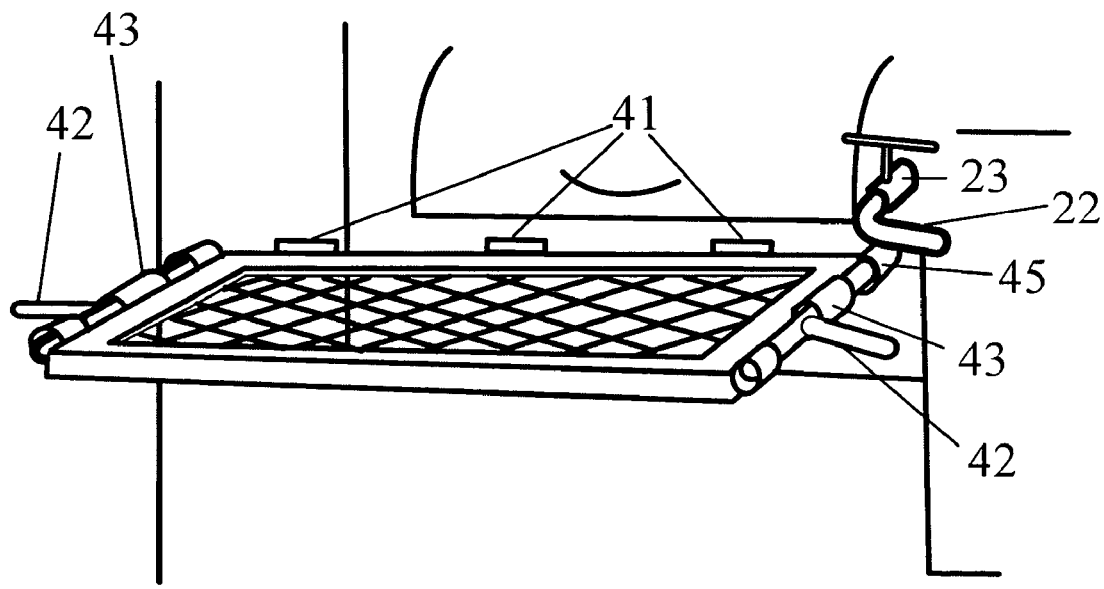
FIG. 5 is a 3-D perspective partial view showing a selectably deployable service table of a barbeque pit smoking system in the deployed position.

As illustrated in FIG. 5, there is provided a 3-D perspective partial view showing selectably deployable service table 40 of barbeque pit smoking system 1 in the deployed position. Service table 40 is rotated into a level position, thereby aligning the axes of slidable pin 42 with receiving hole 45. Slidable pin 42 may then be moved inward towards the interior of barbeque pit smoking system 1, into receiving hole 45. For convenience of operation, slidable pin 42 may be rotated by a protruding handle disposed on slidable pin 42. Of particular convenience to the user of barbeque pit smoking system 1 is to present the protruding handle of slidable pin 42 in a structural configuration that is similar or identical to shaft handle 22. The user, understanding the manner of grasping one is then already accustomed to the manner of grasping the other, providing a level of comfort and familiarity to the user during operation of the barbeque system.

In operation, airflow from firebox 2 to cooking pit 3 may be achieved by unscrewing screwing pressure knob 24 to mobilize shaft handle 22. Shaft handle 22 may then be rotated, causing a change in the volume and character of airflow from firebox 2 to cooking pit 3. Shaft handle 22 may be immobilized by screwing screwing pressure knob 24. During the cooking process, these steps may be repeated so as to adjust the volume and character of airflow to suit any changing needs. A table may be selectively deployed and locked in place, using an operation and handle structure substantially similar to the operation and handle structure of shaft handle 22.

The foregoing description is presented for purposes of illustration and description, and is not intended to limit the invention to the forms disclosed herein. Consequently, variations and modifications commensurate with the above teachings and the teaching of the relevant art are deemed to reside within the spirit and scope of the invention as claimed and described.

What is claimed is:

1. A barbeque pit smoker comprising:
   a cooking pit having a first side, a second side, and a front side;
   an access door disposed on said front side of said cooking pit;
   a firebox disposed adjacent to said first side of said cooking pit;
   an adjustable pit entry port in communication between said cooking pit and said firebox;
   an upright chimney disposed adjacent to a second side of said cooking pit, said upright chimney in communication with said cooking pit;
   a first end of a shaft disposed on said adjustable pit entry port, whereby communication between said cooking pit and said firebox may be regulated;
   a first rotating handle disposed on a second end of said shaft, said rotating handle disposed proximate to said access door;
   a service table disposed proximate to said access door;
   a hinged member rotatably connecting said service table with said cooking pit;
   a receiving hole proximate to said access door disposed on said cooking pit;
   a slidable pin slidably disposed on said service table, said slidable pin fitably received by said receiving hole; and
   a second rotating handle forming at least a portion of said slidable pin.

2. The barbeque pit smoker of claim 1 wherein said first rotating handle and said second rotating handle are substantially similar in structural operation.

3. The barbeque pit smoker of claim 1 wherein said upright chimney further comprises a vaulted top portion.

4. The barbeque pit smoker of claim 1 wherein said first rotating handle further comprises a screwing pressure knob disposed on said first rotating handle, said screwing pressure knob providing an adjustable amount of frictional force on said first rotating handle, thereby regulating the rotational mobility of said first rotating handle.

5. A barbeque pit smoker comprising:
   a cooking pit having a first side, a second side, and a front side;
   an access door disposed on said front side of said cooking pit;
   a firebox disposed adjacent to said first side of said cooking pit;
   an adjustable pit entry port in communication between said cooking pit and said firebox;
   an upright chimney disposed adjacent to a second side of said cooking pit, said upright chimney in communication with said cooking pit;
   a first end of a shaft disposed on said adjustable pit entry port, whereby communication between said cooking pit and said firebox may be regulated;
   a first rotating handle disposed on a second end of said shaft, said rotating handle disposed proximate to said access door; and
   wherein said first rotating handle further comprises a screwing pressure knob disposed on said first rotating handle, said screwing pressure knob providing an adjustable amount of frictional force on said first rotating handle, thereby regulating the rotational mobility of said first rotating handle.

6. A barbeque pit smoker system having a cooking pit with pit access, firebox, and upright chimney, the barbeque pit smoker system further comprising:
   means for regulating the airflow from the firebox to the cooking pit;
   means for selectably tabling, said means for selectably tabling disposed proximate to the pit access of the cooking pit;
   wherein said means for selectably tabling further comprises:
      means for supporting a table, said means for supporting a table comprising a sliding pin and a means for controlling said sliding pin; and
   wherein:
      said sliding pin control means of said support means comprises a first handle;
      said control means of said regulating means comprises a second handle; and
      said first handle and said second handle present substantially similar structure.

7. The barbeque pit smoker system of claim 6 wherein the upright chimney further comprises a vaulted top portion.

* * * * *